United States Patent
Kean et al.

(10) Patent No.: US 11,222,202 B2
(45) Date of Patent: Jan. 11, 2022

(54) TARGETED TESTING AND MACHINE-LEARNING SYSTEMS FOR DETECTING AND IDENTIFYING MACHINE BEHAVIOR

(71) Applicant: Deere & Company, Moline, IL (US)

(72) Inventors: Michael G. Kean, Dubuque, IA (US); Robert A. Hamilton, Dubuque, IA (US); Keith N. Chaston, Dubuque, IA (US); Sean Mairet, Dubuque, IA (US); Francois Stander, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 445 days.

(21) Appl. No.: 16/247,230

(22) Filed: Jan. 14, 2019

(65) Prior Publication Data

US 2020/0226350 A1 Jul. 16, 2020

(51) Int. Cl.
*G06K 9/00* (2006.01)
*G01M 99/00* (2011.01)
*G06K 9/62* (2006.01)

(52) U.S. Cl.
CPC ......... *G06K 9/0055* (2013.01); *G01M 99/005* (2013.01); *G06K 9/6262* (2013.01)

(58) Field of Classification Search
CPC ............ G01M 99/005; G06K 9/00536; G06K 9/0055; G06K 9/6262; G06K 9/6267
See application file for complete search history.

(56) References Cited

U.S. PATENT DOCUMENTS

| | | |
|---|---|---|
| 8,010,260 B2 | 8/2011 | Toda |
| 8,306,797 B2 | 11/2012 | Furem et al. |
| 8,838,324 B2 | 9/2014 | Suzuki et al. |
| 9,057,174 B2 | 6/2015 | Uchiyama et al. |

(Continued)

FOREIGN PATENT DOCUMENTS

EP   3162965 A1   5/2017

OTHER PUBLICATIONS

Lauzon et al., An introduction to deep learning, 2012 11th International Conference on Information Science, Signal Processing and their Applications (ISSPA), pp. 1438-1439, downloaded on Nov. 26, 2020.

(Continued)

*Primary Examiner* — Kyle R Quigley
(74) *Attorney, Agent, or Firm* — Michael Best & Friedrich LLP (57) ABSTRACT

Systems and methods are described for identifying a behavior of a machine. A computer system receives a signal indicative of operation of a field machine and applies a deep learning algorithm to identify a pattern in a collection of signals stored on a computer-readable memory. The collection of signals includes the received signal indicative of operation of the field machine and other signals. A series of targeted tests are performed using a test machine while monitoring a signal indicative of operation of the test machine. A behavior is identified during the series of targeted tests that produces a signal that matches the pattern identified by the deep learning algorithm. An occurrence of the behavior is then automatically identified in the field machine in response to detecting the pattern in the received signal indicative of operation of the field machine.

22 Claims, 6 Drawing Sheets

(56) References Cited

U.S. PATENT DOCUMENTS

| | | | |
|---|---|---|---|
| 9,139,981 B2 | 9/2015 | Mitchell et al. | |
| 9,691,025 B2 | 6/2017 | Kirsch | |
| 9,982,414 B2 | 5/2018 | Jang | |
| 2006/0122809 A1 | 6/2006 | Clarke et al. | |
| 2009/0299581 A1* | 12/2009 | Price | F02D 41/021 |
| | | | 701/50 |
| 2010/0100338 A1 | 4/2010 | Vik et al. | |
| 2014/0032061 A1 | 1/2014 | Wulf et al. | |
| 2016/0078340 A1* | 3/2016 | Kirsch | G06N 5/022 |
| | | | 706/12 |
| 2016/0292933 A1 | 10/2016 | Sprock et al. | |
| 2017/0314987 A1 | 11/2017 | Yamada et al. | |
| 2018/0174377 A1 | 6/2018 | Collins | |
| 2020/0005185 A1* | 1/2020 | Kim | G06N 7/005 |
| 2020/0007064 A1* | 1/2020 | Wang | H02P 23/0031 |

OTHER PUBLICATIONS

Tobias Scheffer et al., Neural Networks, Intelligent Data Analysis 2, pp. 1-84, retrieved on Nov. 26, 2020.

German Search Report issued in counterpart application No. 102020200368.8 dated Nov. 30, 2020 (12 pages).

* cited by examiner

TARGETED TESTING AND MACHINE-LEARNING SYSTEMS FOR DETECTING AND IDENTIFYING MACHINE BEHAVIOR

BACKGROUND

The present invention relates to systems and methods for detecting conditions or behaviors of a machine including, for example, heavy machinery and construction vehicles.

SUMMARY

In one embodiment, the invention provides a method of identifying a behavior of a machine. A computer system receives a signal indicative of operation of a field machine and applies a deep learning algorithm to identify a pattern in a collection of signals stored on a computer-readable memory. The collection of signals includes the received signal indicative of operation of the field machine and other signals. A series of targeted tests are performed using a test machine while monitoring a signal indicative of operation of the test machine. A behavior is identified during the series of targeted tests that produces a signal that matches the pattern identified by the deep learning algorithm. An occurrence of the behavior is then automatically identified in the field machine in response to detecting the pattern in the received signal indicative of operation of the field machine.

In another embodiment, the invention provides a method of identifying a behavior of a machine by receiving a plurality of signals from a plurality of field machines. The plurality of signals includes a time-domain output of each of a plurality of sensors of each field machine. The plurality of signals are stored to a computer-readable memory and a deep-learning algorithm is applied to the signals to identify a plurality of patterns in the signals. A series of targeted tests is then performed using a test machine while monitoring a time-domain output of each of the plurality of sensors of the test machine. The series of targeted tests includes performing a series of operations under a defined varying set of operating conditions. A first behavior is identified during the series of targeted tests when the output of the plurality of sensors of the test machine matches a first pattern of the plurality of patterns identified by the deep learning algorithm. A database identifies a plurality of behaviors each corresponding to a different pattern of the plurality of patterns is updated. Each behavior defined by the database includes an identified operation of a machine and an identified operating condition of the machine. Occurrences of the first behavior in one of the plurality of field machines are then automatically identified in response to detecting the first pattern in the signals from the plurality of sensors of the field machine.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Identifying the operating state and application of a machine on a work site can be useful from several different vantage points. For example, knowledge of an operating state of a machine can be used to correlate warranty with an application, to identify customer usage for improved machine design, and to identify patterns in machine usage that can be used to develop (fully or partially) automated machines.

One mechanism for machine state identification is to prescribe the machine states. These prescribed states (for example, "idle", "transport", "in cut", "swing to truck", "dump", "swing to trench", etc.) might be manually correlated with sensor readings indicating machine state (for example, an operator swing command, a pump pressure, an engine speed, an engine load, etc.). The correlation or accuracy of the state machine can then determined using a small set of physical tests. However, this is time consuming, expensive, allows a very narrow understanding of machine behavior, and achieves only a low level of correlation. Furthermore, it can only be used to confirm an existing understanding of the machine, because this approach requires knowledge of the features that are to be identified in the machine data before attempting to classify machine behavior. In some implementations, types of machine learning—such as, for example, "deep learning"—may be combined with machine telematics to achieve a much broader understanding of operating states/applications and corresponding sensor readings.

Figure 1:
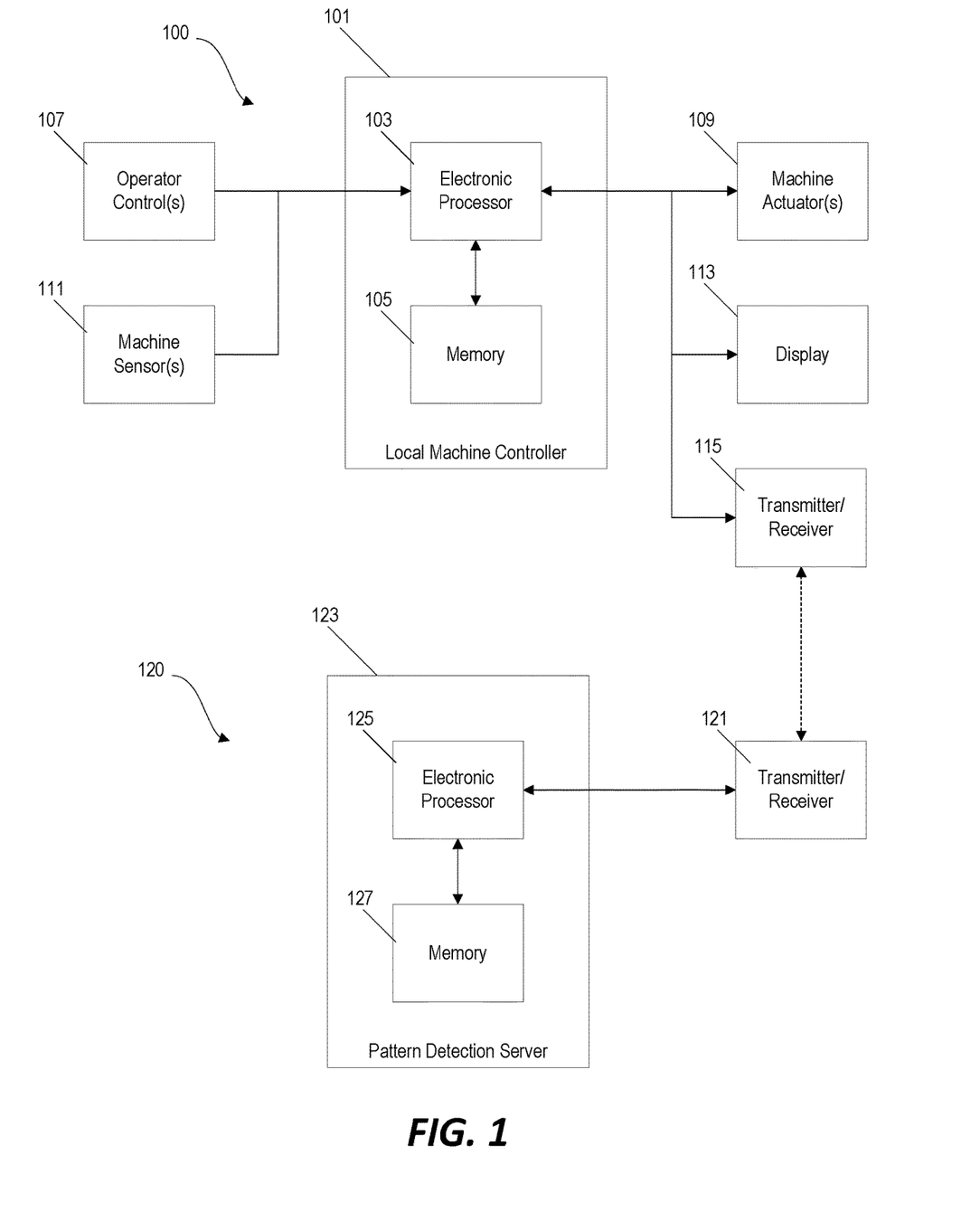
FIG. 1 is a block diagram of a local machine controller in communication with a remote server according to one embodiment.

FIG. 1 illustrates an example of a telematics system for a field machine 100—such as, for example, a bulldozer, a loader, a crawler, or an excavator—in communication with a remote telematics server 120. In the example of FIG. 1, the field machine 100 is equipped with a local machine controller 101 that includes an electronic processor 103 and a non-transitory, computer-readable memory 105. The memory 105 stores instructions that are executed by the electronic processor 103 to provide functionality such as described herein. The local machine controller 101 is communicatively coupled to one or more operator controls 107 and, in some implementations, the local machine controller provides an output control signal to one or more machine actuators 109 to control the operation of the machine based (at least in part) on signals received from the operator controls 107. The local machine controller 111 is also communicatively coupled to one or more machine sensors 111, a display 113 (e.g., a user interface screen and/or indicator lights), and a transmitter and/or receiver 115.

In the example of FIG. 1, the local machine controller 101 is configured to capture and transmit to the remote telematics server 120 live data including, for example, inputs to the operator controls 107, sensor outputs from the machine sensors 111, and output control signals sent to the machine actuators 109. This data is transmitted from the transmitter/receiver 115 of the field machine 100 and is received by a transmitter/receiver 121 of the remote telematics server 120. In some implementations, the data from the field machine 100 is "live streamed" to the remote telematics server 120 in near real-time while, in other implementations, the data might be sent periodically or in larger compiled data files. Once received by the remote telematics server 120, the data is retained and stored in a databased of a pattern detection server 123. In the example of FIG. 1, the pattern detection server 123 includes an electronic processor 125 and a non-transitory computer-readable memory 127.

Although FIG. 1 shows only a single field machine in communication with the remote telematics server 120, in some implementations, a full fleet of machines can be configured to stream live data back to the central database of the pattern detection server 123. In some implementations, this database is configured to retain a full history of every signal on the machine for every machine of a certain type ever made. It can represent the full spectrum of machine usage for that subset of machines. In some implementations, the fleet usage data is then passed to a deep learning algorithm executed by the pattern detection server 123. The deep learning algorithm applies machine learning principles and combs the full history of machine usage to identify patterns in the signals.

In some implementations, the data is first analyzed to identify time-domain and/or frequency domain patterns in the behavior of a single signal. A second analysis is then performed to identify correlations between these identified patterns. This provides insight into how the machine is behaving, which patterns of behavior are correlated, and in what way the patterns might be correlated.

The deep learning algorithm provides a list of patterns, how the patterns are correlated, and how they can be identified or defined. However, it does not provide any insight as to what the patterns mean, what causes them, or how they can be related to machine operation or machine design. Instead, a series of targeted tests are developed and performed using a similar machine while a full set of machine signals is recorded during the targeted correlation testing. These signals are then processed to search for the patterns and correlations that were previously identified by the deep learning algorithm. By cross-referencing the targeted test plan and operations performed during the targeted testing with the resulting detected patterns and correlations, the physical meaning of the deep learning patterns is determined. In this way, the vehicle state can be understood in a more complex, emergent way rather than through prescriptive methods.

Once the patterns and correlations are identified by the deep learning algorithm and their meanings are identified through the targeted testing, the patterns/correlations and, in turn, the underlying behavior or system state can be identified in a field machine in real time and used, for example, to target how the machine is being used, to optimize performance of the machine to a current use, to generate predictive diagnostic messages based on use, to train operators to perform better, or to automate the machine in part or in whole.

Figure 2:
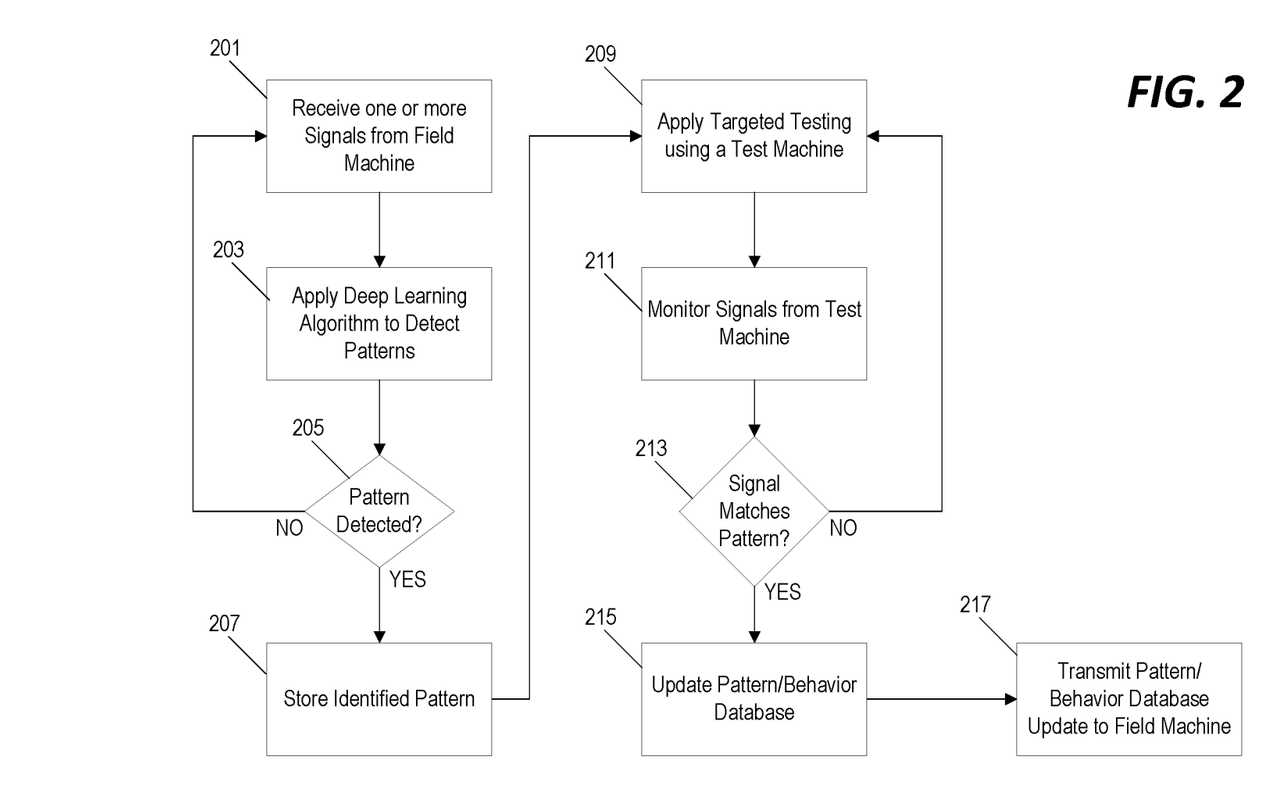
FIG. 2 is a flowchart of a method for identifying a pattern in signal data from field vehicle sensors and identifying a behavior associated with the pattern through targeted testing.

FIG. 2 illustrates an example of a method executed by the pattern detection server 121 for creating and/or updating a pattern/behavior database. First, the pattern detection server 121 receives one or more signals from a field machine (step 201). As discussed above, these received signals may, in some implementations, be combined with other signals from other machines in a central database. The pattern detection server 121 then applies a deep learning algorithm to the accumulated/received data to detect patterns and/or correlations of patterns (step 203). When a pattern and/or correlation of patterns is identified by the deep learning algorithm (step 205), an identification of the detected pattern is stored to a memory (step 207). For example, the system may be configured to store a complete copy of the pattern itself or may be configured to store one or more criteria for detecting/identifying the pattern or correlation of patterns in the real-time sensor data of a field machine during operation.

After patterns and/or correlations of patterns are identified by the deep learning algorithm, a series of targeted tests is developed and performed using a test machine (step 209). The test machine is the same type of machine as the field machine and the operations of the targeted testing are designed to be similar to tasks performed by the field machine that might generate the detected pattern or correlation of patterns. The signals from the test machine are monitors as the test machine is used to perform the targeted testing (step 211) and the system (e.g., either the pattern detection server or a local controller of the test machine) detects when the signals of the test machine match the pattern or correlation of patterns that had been previously identified by the deep learning algorithm (step 213).

In response to detecting a pattern or correlation of patterns in the test machine that matches the pattern or correlation of patterns detected by the deep learning algorithm, knowledge of the targeted testing that was being performed at the same time is used to identify a particular behavior, condition, or system state corresponding to the particular pattern or correlation of patterns (either automatically by the controller/server or manually). A pattern/behavior database is then updated to include the pattern/correlation of patterns identified by the deep learning algorithm and the behavior identified by the targeted testing as corresponding to the identified pattern/correlation (step 215). This process is repeated and the pattern/behavior database is repeatedly updated as other signals are received from field machines, as other patterns/correlations are identified by the deep learning algorithm, and as other associated behaviors are identified by the targeted testing. The updated pattern/behavior database is then transmitted to the field machine for use during operation of the field machine (step 217).

As discussed above, the "targeted tests" include a series of tests designed to be performed by a test machine that is the same type of machine as the field machine and includes tasks similar to tasks that would be performed by the field machine that might generate the detected pattern, correlation of patterns, or other features in the collected field data. One specific example of targeted testing that might be performed include excavator trenching where the excavated soil is deposited in a spoil pile parallel to the trench. The series of specific tests in this test plan may include, for example, (a) lowering the boom towards the ground, (b) beginning to dig or "cut" with the bucket, (c) lifting soil, (d) turning the boom towards the spoil pile while carrying soil in the bucket, (e)

releasing the soil into the spoil pile, and (f) turning the boom back towards the trench without soil in the bucket. Other examples of a targeted test may include excavator trenching where the excavated soil is deposited in a truck where the truck tires are level with the excavator tracks or mass excavation where the excavator is on a raised bench and excavated soil is deposited in a truck with the top of the truck bed level with the excavator tracks. "Test plans" can be developed using one or more of these specific examples noted above or to include other operations or operating contexts instead of or in addition to the examples discussed above. Test plans can also be developed for other field machines and/or for other particular uses/operations.

Also, as discussed in further detail below, a "test plan" can be developed to include a series of "test labels" corresponding to specific operations performed by the machine during the targeted testing (e.g., lifting soil). During performance of the targeted testing using the test machine, machine data is collected and correlated with a particular "test label" which is then used, in some implementations, as an input for "supervised machine learning" operation.

Figure 3:
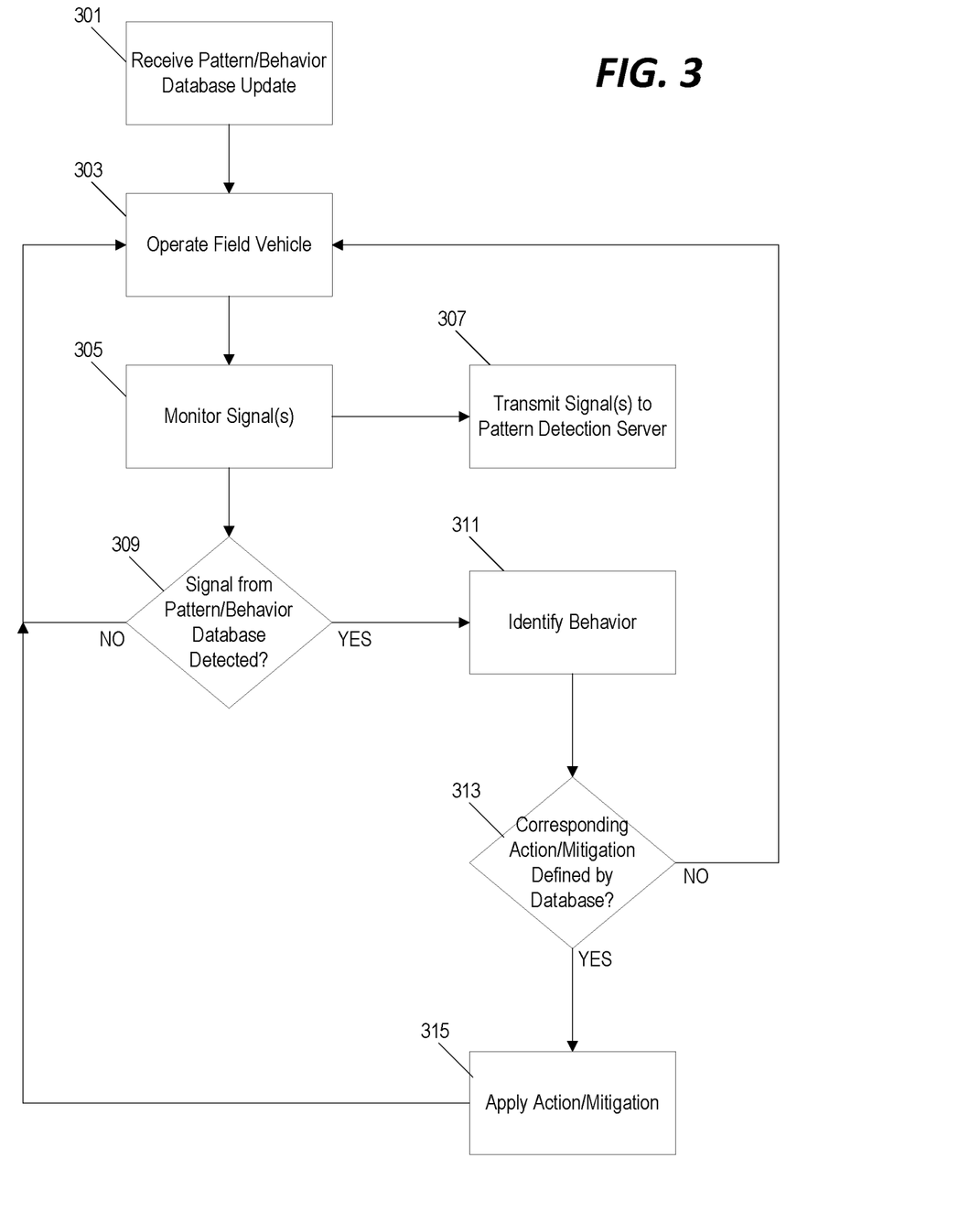
FIG. 3 is a flowchart of a method for detecting occurrences of a behavior by detecting signal patterns that were previously identified and defined by the method of FIG. 2.

FIG. 3 illustrates an example of a method executed by the field machine to utilize the pattern/behavior database during real-time operation of the field machine. After the updated pattern/behavior database is received by the field machine (step 301), the field machine is operated by the user (step 303) and the signals generated by the field machine are monitored (step 305). As discussed above, these signals are either live streamed to the remote telematics server or are stored for later transmission to the pattern detection server (step 307).

When the local machine controller 101 of the field machine detects a pattern or correlation of patterns that is stored in the pattern/behavior database (step 309), it also identifies a behavior as defined by the pattern/behavior database corresponding to the detected pattern or correlation of patterns (step 311). In some implementations, the local machine controller may be configured to perform a particular action in response to detecting a particular behavior or condition. In other implementations, the pattern/behavior database may be further configured to define a particular action to be performed by the local machine controller in response to detecting a particular pattern or correlation of patterns. In the example of FIG. 3, the local machine controller is configured to determine whether an action or mitigation is defined by the database corresponding to the pattern or correlation of patterns that have been identified in the signals of the field machine (step 313). If a corresponding action or mitigation is defined by the pattern/behavior database, then the local machine controller will apply the action or mitigation in response to detecting the particular pattern or correlation of patterns (step 315).

In some implementations, the system may be configured to maintain and report to a remote server a record of how many occurrences of a particular behavior have been detected and for how long each occurrence lasted. In other implementations, maintaining this type of record may be the action defined by the pattern/behavior database for a particular behavior/signal. Other examples of actions that may be defined by the pattern/behavior database to be executed in response to detecting a particular behavior/signal may include adjusting an operating parameter of the machine or outputting an alert to the operator (e.g., through the display 113) indicating that a particular behavior has been detected.

One particular example of actions that can be initiated based on one or more detected occurrences of a behavior/signal may include cross referencing machine patterns with necessary repairs. Finding a correlation where one or more fleet wide behaviors tends to lead to a certain type of repair can be used to predict which machines will need the repair, identify abusive behavior, enable operators to be training to not perform abusive behaviors, enable engineering to redesign components, or to perform a more accurate root cause analysis for repairs that were unanticipated during design.

These patterns and behaviors may also be used (for example, by a manufacturer or machine dealer) to determine when a particular user/customer has the wrong size or type of machine for a particular usage profile. By comparing behaviors across different sizes of machines, the pattern detection server can be configured to identify patterns that are correlated with damage on one machine type/size, but not on another. This may indicate that a customer/user could avoid damaging their machine and needing repairs if they purchase a larger machine. This could also be used to identify people who are using oversized machines. For customers owning/operating a fleet of machines, this could provide valuable data as far as which of their machines should be used on which jobs in order to optimize their fleet usage.

Another potential action that can be performed in response to detecting one or more occurrences of a particular pattern or correlation of patterns is to validate machine automation features and autonomous machines against field usage of the machine. If an automation feature generates the same usage pattern as an expert operator, it can be confirmed that the automation feature is performing with equal quality and efficiency. This can be used as verification of an implemented automation feature or during development of the autonomous features as part of either supervised or reinforcement training. In supervised learning, the control agent varies how it applies machine commands to attempt to more closely reproduce the pattern seen in the expert operators. In reinforcement learning, creating patterns is one of many metrics that can be used as a reward to help the machine learn an optimized behavior.

Figure 4:
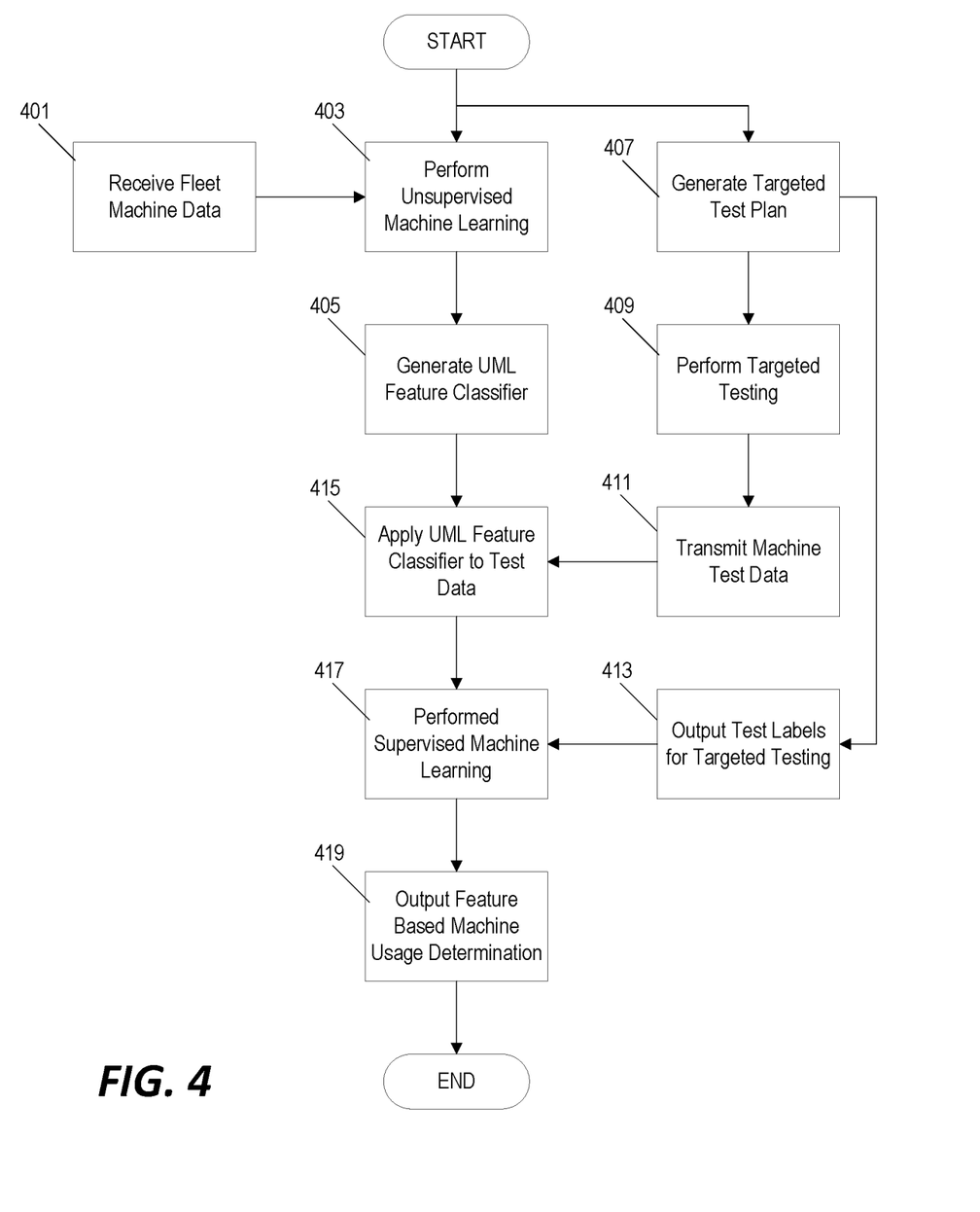
FIG. 4 is a flowchart of a method for identifying and correlating signal data patterns/features with machine operations using unsupervised machine learning, supervised machine learning, and targeted testing data.
Figure 5:
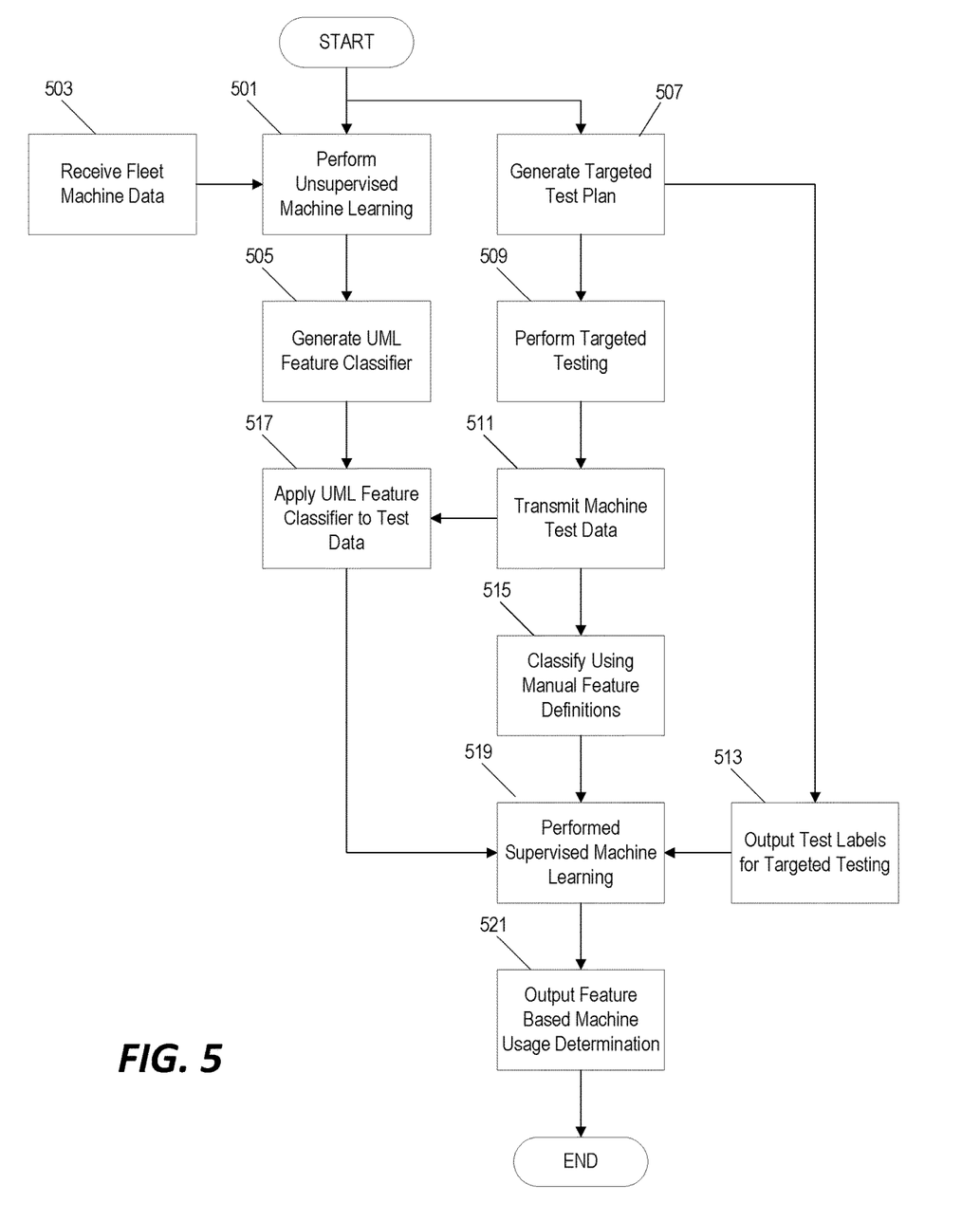
FIG. 5 is a flowchart of a method for identifying and correlating signal data patterns/features with machine operations using unsupervised machine learning, supervised machine learning, targeted testing data, and manually defined classifications.
Figure 6:
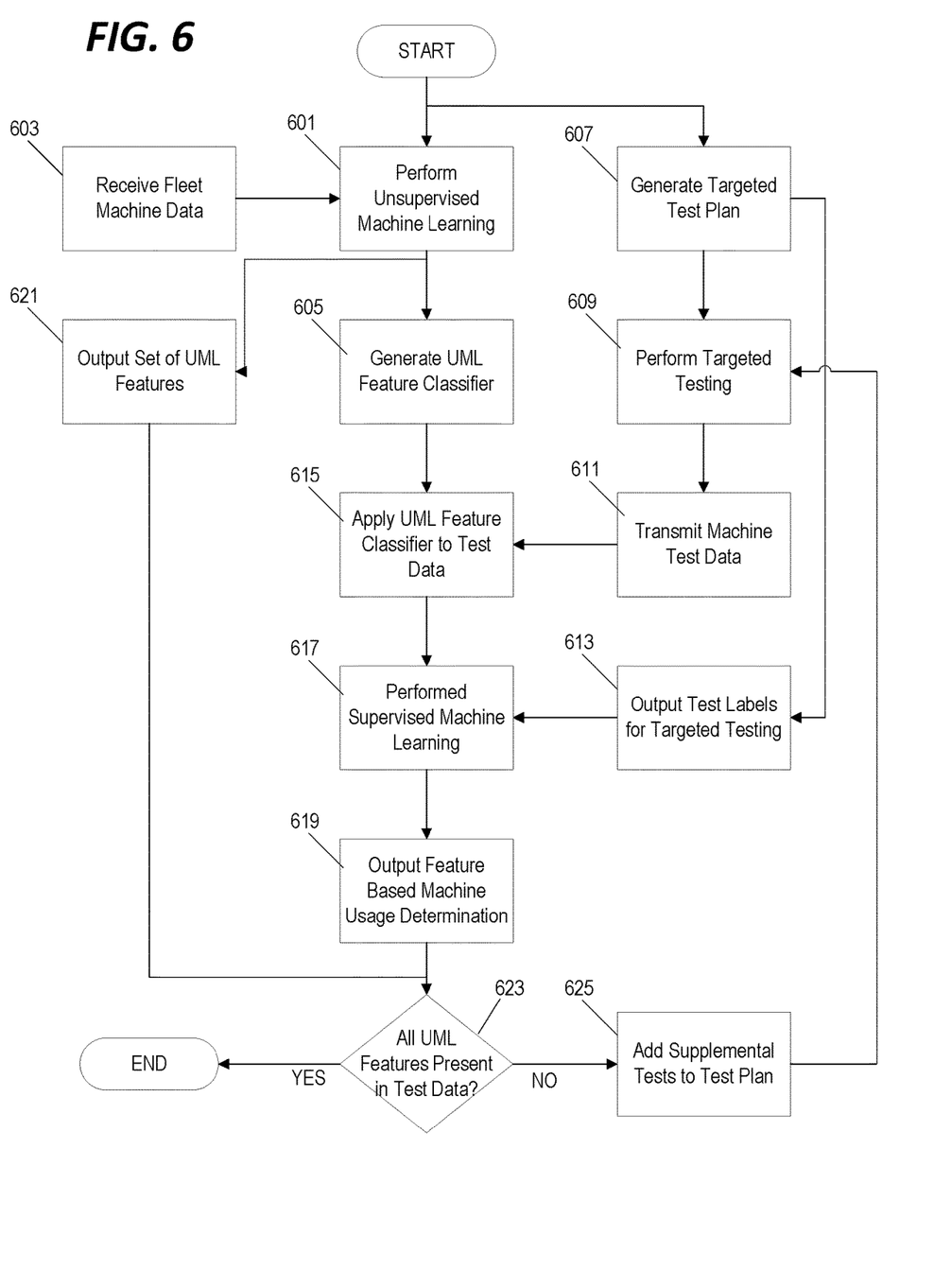
FIG. 6 is a flowchart of a method for identifying and correlating signal data patterns/features with machine operations and for updating a supplementary targeting testing plan.

The examples presented above illustrate only a few examples of how systems may be configured to identify and classify machine behaviors using "targeted testing." Other specific implementations are possible. For example, in some implementations, a two-stage "machine learning" approach is utilized including an "unsupervised learning" performed on collected field data (i.e., to identify patterns and/or features in the collected data) and a "supervised learning" performed on machine data collected during targeted testing (i.e., to correlate classified patterns/features with specific operations of the machine). FIGS. 4-6 present some detailed examples that include this two-stage machine learning approach.

In the method of FIG. 4, machine data is collected from a plurality of different field machines in a fleet (step 401). Unsupervised machine learning is performed on the collected fleet machine data (step 403) to generate a UML ("unsupervised machine learning") feature classifier (step 405). The UML feature classifier is configured to receive time-series machine data and to classify portions of the received data according to a set of classifications that were previously identified/determined from the collected fleet data. However, at this stage, the UML feature classifier is unable to determine what operation(s), if any, the classified features may represent.

A targeted test plan is also generated (step 407) and performed using a test machine (step 409). Machine data collected from the test machine during the targeted testing and the corresponding "test labels" the output from the targeted testing (steps 411 and 413). The machine test data is then provided as an input to the UML feature classifier (step 415) and is classified based on the features identified/detected during the unsupervised machine learning. The classifications of the test data are then passed to a supervised deep learning algorithm that correlates them with the test labels (step 417). The supervised machine learning determines which combinations of features determined by the UML feature classifier are characteristic of each of the tests performed during the targeted testing (step 419). In some implementations, the supervised machine learning performed on the test data results in a classifier that is configured to receive machine data from a field machine in real time and output an indication of a particular operation being performed by the field machine.

FIG. 5 illustrates another method that utilizes both supervised and unsupervised machine learning, but that is further augmented by other manual or predefined classifications. Like the example of FIG. 4, unsupervised machine learning is performed (step 501) on fleet machine data (step 503) in order to generate a UML feature classifier (step 505). A targeted test plan is generated (step 507) and performed using a test machine (step 509) to produce a set of machine test data (step 511) and test labels (step 513). However, in the example of FIG. 5, additional manual (or other predetermined classification criteria) are applied to the machine test data (step 515) in addition to the UML feature classifier (step 517). The output of the manual classification, the output of the UML feature classifier, and the test labels are then provided as inputs to the supervised machine learning (step 519) and the supervised machine learning determines which combinations of features determined by the UML feature classifier are characteristic of each of the tests performed during the targeted testing (step 521).

For example, a targeted test plan may include an excavator cycle that consists of a CUT operation, a LOADED REPOSITION operation, a DUMP operation, and an UNLOADED REPOSITION operation that occur in that order (beginning with the UNLOADED REPOSITION operation). The UML feature classification algorithm can then be applied to the test data that then transitions between these operations based on manually determined criteria. For example, a transition from the CUT operation to the LOADED REPOSITION operation could be indicated by the manually determined criteria when a swing command begins during the CUT operation. Similarly, a transition from LOADED REPOSITION to DUMP could be indicated by the manually determined criteria when a "bucket dump" command is initiated during the LOADED REPOSITION operation. A transition from DUMP to UNLOADED REPOSITION could be indicated by the manually determined criteria when a swing command in an opposite direction from the LOADED REPOSITION operation is initiated during the DUMP operation. Finally, a transition from UNLOADED REPOSITION to CUT could be indicated by the manually determined criteria when the measured pump pressure (e.g., for one or more hydraulic cylinders of the excavator boom) goes high (e.g., above a threshold) during the UNLOADED REPOSITION operation.

Lastly, FIG. 6 illustrates a method in which the targeted testing plan is supplemented/updated and additional testing is performed until all of the features identified in the fleet machine data are correlated to particular operations performed during targeted testing. Again, unsupervised machine learning is performed (step 601) on fleet machine data (step 603) in order to generate a UML feature classifier (step 605). A targeted test plan is generated (step 607) and performed using a test machine (step 609) to produce a set of machine test data (step 611) and test labels (step 613). The UML feature classifier is applied to the machine test data collected during the targeted testing (step 615) to identify UML feature classifications in the collected test data and the supervised machine learning is performed to correlate features classified from the test machine data with particular test labels (step 617). The supervised machine learning determines which combinations of features determined by the UML feature classifier are characteristic of each of the tests performed during the targeted testing (step 619).

However, after performing the supervised machine learning, the system reviews a set of the UML features that were identified by the unsupervised machine learning from the fleet machine data (step 621) and determines whether all of those identified features were also present/detected in the test data (step 623). If not, then the test data fails to span the classification and additional tests are necessary in order to represent all of the behaviors seen in the fleet data. Accordingly, supplementary tests are identified and added to the test plan (step 625) and the target testing is continued according to the supplementary test plan (step 609) until all of the behaviors from the fleet machine data have been identified in at least one test.

Thus, the invention provides, among other things, a system and method for identifying patterns or correlations of patterns in machine signals using deep learning, for ascribing a behavior associated with the pattern through targeted testing, and for operating a field machine based on the identified signal patterns and the defined corresponding behaviors. Various features and advantages of the invention are set forth in the following claims.

What is claimed is:

1. A method of identifying a behavior of a machine, the method comprising:
  receiving, by a computer system, a signal indicative of operation of a field machine;
  applying, by the computer system, a deep learning algorithm to the received signal indicative of the operation of the field machine, wherein the deep learning algorithm is configured to discover a pattern in a collection of signals stored on a computer-readable memory, wherein the discovered pattern is unknown to correspond to any particular behavior of the field machine, the collection of signals including the received signal indicative of the operation of the field machine;
  operating a test machine to perform a series of targeted tests subsequent to discovering a new pattern in the collection of signals;
  detecting an occurrence of the new pattern in a signal indicative of operation of the test machine while performing the series of targeted tests;
  identifying a behavior of the test machine during the series of targeted tests that produces, in the signal indicative of the operation of the test machine, the detected occurrence of the new pattern based on a targeted test of the series of targeted tests performed by the test vehicle at a time of the detected occurrence of the new pattern in the signal indicative of operation of the test machine;
  associating the identified behavior with the new pattern; and
  automatically detecting a subsequent occurrence of the identified behavior in the field machine in response to detecting a subsequent occurrence of the new pattern in the received signal indicative of the operation of the field machine.

2. The method of claim 1, wherein performing the series of targeted tests using the test machine includes performing a series of defined operations under a defined varying set of operating conditions, wherein the series of defined operations and the defined varying set of operating conditions are designed to recreate the identified pattern in the signal indicative of the operation of the test machine.

3. The method of claim 1, wherein receiving the signal indicative of operation of the field machine includes receiving a signal indicative of an output of at least one sensor of the field machine.

4. The method of claim 1, wherein applying the deep learning algorithm includes discovering, in the signal indicative of the operation of the field machine, at least one pattern selected from a group consisting of a time-domain pattern and a frequency-domain pattern.

5. The method of claim 1, further comprising receiving, by the computer system, a plurality of signals from a plurality of field machines, the plurality of signals including a time-domain output of each of a plurality of sensors of each field machine of the plurality of field machines, wherein receiving the plurality of signals from the plurality of field machines includes receiving the signal indicative of operation of the field machine.

6. The method of claim 1, wherein receiving the signal indicative of operation of the field machine includes receiving a signal indicative of at least one selected from a group consisting of an operator swing command signal, a pump pressure signal, an engine speed signal, and an engine load signal.

7. The method of claim 1, further comprising updating, by the computer system, a database identifying a plurality of behaviors each corresponding to a different pattern of a plurality of patterns, wherein each behavior of the plurality of behaviors includes an identified operation of a machine and an identified operating condition of the machine.

8. The method of claim 1, further comprising storing, to the computer-readable memory, a record of each of a plurality of occurrences of the behavior detected for the field machine based on the received signal indicative of operation of the field machine.

9. The method of claim 1, further comprising sending an operation adjustment signal from the computer system to a field machine in response to detecting the subsequent occurrence of the new pattern in the received signals from the field machine, wherein the field machine is configured to adjust operation of the field machine in response to receiving the operation adjustment signal.

10. The method of claim 1, wherein operating the test machine to perform the series of targeted tests includes operating the test machine under a series of different repair and maintenance conditions, wherein the identified behavior includes operating a machine that is in need of a particular repair or maintenance, and further comprising transmitting a signal from the computer system identifying the particular repair or maintenance required for the field machine in response to detecting the occurrence of the identified pattern in the received signal indicative of operation of the field machine.

11. The method of claim 1, wherein operating the test machine to perform the series of targeted tests includes operating the test machine to perform a plurality of different tasks including at least one task for which the test machine is not optimally suited, wherein the identified behavior includes using the field machine to perform a task for which the field machine is not optimally suited, and further comprising automatically transmitting a signal from the computer system advising an end user to use a different type of field machine for a particular task in response to detecting the occurrence of the identified pattern in the received signal indicative of operation of the field machine.

12. A method of identifying a behavior of a machine, the method comprising:
receiving, by a computer system, a plurality of signals from a plurality of field machines, the plurality of signals including a time-domain output of each of a plurality of sensors of each field machine of the plurality of field machines;
storing, by the computer system, the plurality of signals to a computer-readable memory;
applying, by the computer system, a deep-learning algorithm to the plurality of signals, wherein the deep-learning algorithm is configured to discover a plurality of patterns in the plurality of signals stored to the computer-readable memory, wherein the discovered patterns are unknown to correspond to any particular behavior of the field machines, wherein the plurality of patterns discovered by the deep-learning algorithm includes a first pattern discovered in a received signal from a first sensor of at least one field machine of the plurality of field machines;
operating a test machine to perform a series of targeted tests subsequent to discovering the first pattern, wherein the series of target tests includes performing a series of operations under a defined varying set of operating conditions;
detecting, in a signal received from the first sensor of the test machine while performing the series of targeted tests, an occurrence of the first pattern;
identifying a first behavior of the test machine during the series of targeted tests, wherein the identified first behavior occurs contemporaneous to the detected occurrence of the first pattern in the signal received form the first sensor of the test machine;
updating, by the computer system, a database identifying a plurality of behaviors each corresponding to a different pattern of the plurality of patterns identified discovered by the deep-learning algorithm, wherein each behavior of the plurality of behaviors includes an identified operation of a machine and an identified operating condition of the machine, wherein updating the database includes updating the database to associate the first behavior with the first pattern; and
automatically detecting, by the computer system, a subsequent occurrence of the first behavior in one of the plurality of field machines in response to detecting a subsequent occurrence of the first pattern in the received signals from the first sensor of the one of the plurality of field machines.

13. The method of claim 12, wherein receiving the plurality of signals from the plurality of field machines includes receiving a periodic or continuous output from a transmitter of a first field machine of the plurality of field machines.

14. The method of claim 12, wherein receiving the plurality of signals from the plurality of field machines includes receiving at least one selected from a group consisting of an operator swing command signal, a pump pressure signal, an engine speed signal, and an engine load signal.

15. The method of claim 12, wherein applying the deep-learning algorithm includes discovering at least one selected from a group consisting of a time-domain pattern and a frequency-domain pattern.

16. The method of claim 12, further comprising
discovering a pattern combination including a second pattern and a third pattern identified by the deep-learning algorithm, wherein occurrences of the first pattern and the second pattern are discovered by the deep-learning algorithm in time-corresponding outputs from two different sensors in a first field machine,
detecting in output signals from the two different sensors of the test machine while performing the series of targeted tests, an occurrence of the pattern combination;
identifying a second behavior of the test machine during the series of targeted tests, wherein the identified second behavior occurs contemporaneous to the occurrence of the pattern combination;
updating the database to associate the second behavior with the pattern combination; and
automatically detecting a subsequent occurrence of the second behavior in the one of the plurality of field machines in response to detecting a subsequent occurrence of the pattern combination in the received signals from the two different sensors of the one of the plurality of field machines.

17. The method of claim 12, further comprising storing, to the computer-readable memory, a record of each of a plurality of occurrences of the first behavior detected for each individual field machine of the plurality of field machines.

18. The method of claim 17, wherein operating the test machine to perform the series of targeted tests includes operating the test machine to perform a plurality of different tasks including at least one task for which the test machine is not optimally suited, wherein the database indicates that the first pattern corresponds to a field machine being used for a task for which the field machine is not optimally suited, and further comprising automatically outputting a report identifying a different type of field machine more suited for an end user based on a number of occurrences of the first behavior detected for a first field machine.

19. The method of claim 12, wherein operating the test machine to perform the series of targeted tests includes operating the test machine to perform a plurality of different tasks including at least one task for which the test machine is not optimally suited, wherein the database indicates that the first pattern corresponds to a field machine being used for a task for which the field machine is not optimally suited, and further comprising automatically transmitting a signal from the computer system advising an end user to use a different type of field machine for the task.

20. The method of claim 12, further comprising sending an operation adjustment signal from the computer system to a first field machine of the plurality of field machines in response to detecting the first pattern in the received signals from the first field machine, wherein the first field machine is configured to adjust operation of the first field machine in response to receiving the operation adjustment signal.

21. The method of claim 12, wherein operating the test machine to perform the series of targeted tests includes operating the test machine under a series of different repair and maintenance conditions, wherein the database further identifies a particular repair or maintenance task corresponding to the first pattern, and further comprising:
transmitting a signal from the computer system indicating a need for the particular repair or maintenance on a first field machine of the plurality of field machines in response to detecting the first pattern in the received signals from the first field machine.

22. The method of claim 21, further comprising automatically scheduling the particular repair or maintenance on the first field machine in response to receiving the signal from the computer system indicating the need for the particular repair or maintenance.

* * * * *